United States Patent [19]

Cronin

[11] Patent Number: 4,476,395
[45] Date of Patent: Oct. 9, 1984

[54] TANDEM-GENERATOR DESIGN FOR AIRCRAFT

[75] Inventor: Michael J. Cronin, Sherman Oaks, Calif.

[73] Assignee: Lockheed Corporation, Burbank, Calif.

[21] Appl. No.: 312,783

[22] Filed: Oct. 19, 1981

[51] Int. Cl.³ .......................................... H02K 7/116
[52] U.S. Cl. ...................................... 290/6; 290/4 C; 310/59; 310/83; 310/112
[58] Field of Search ............... 310/112, 59, 83; 290/6, 290/4 A, 4 C

[56] References Cited

U.S. PATENT DOCUMENTS

| | | | |
|---|---|---|---|
| 653,088 | 7/1900 | Hutin et al. | |
| 907,176 | 12/1908 | Richardson | |
| 1,874,094 | 5/1926 | Ford et al. | |
| 2,085,275 | 6/1937 | Schmidt | 310/112 |
| 2,153,386 | 4/1939 | Morey | 310/59 |
| 3,463,954 | 8/1969 | Latta | 310/90 |
| 3,651,355 | 3/1972 | Mason | 310/112 |
| 3,717,780 | 2/1973 | Hohne, Jr. et al. | 310/112 |
| 3,836,802 | 9/1974 | Parker | 310/154 |
| 4,323,803 | 4/1982 | Danko et al. | 310/59 |

Primary Examiner—S. J. Witkowski
Assistant Examiner—Shelley Wade
Attorney, Agent, or Firm—Louis L. Dachs

[57] ABSTRACT

The invention is an aircraft power generation system which includes a tandem generator (10) which includes left and right generators (14, 15) arranged within a single housing (12). The left and right generators (14, 15) are driven at the anti-drive end of the tandem generator (10) by a gear arrangement including gears (22), (24) and (26). A phase indexer (36) including a phase adjust nut (38) is arranged in conjunction with driven gear (26) to provide for "vernier" phase-alignment of the generator rotors. In an alternative embodiment, phase-alignment of the generator rotors is accomplished by arranging them in-line to form an in-line tandem generator (10').

In a preferred arrangement, an in-line generator (70) is arranged to be isolated from an aircraft engine via an electromechanical disconnect (108). The disconnect (108) includes a pin (130) activated by a solenoid (110), which upon receipt of a disconnect command or signal, pulls the pin (130) from a hole (131) in ring gear (114) thereby disconnecting the tandem generator (70).

2 Claims, 16 Drawing Figures

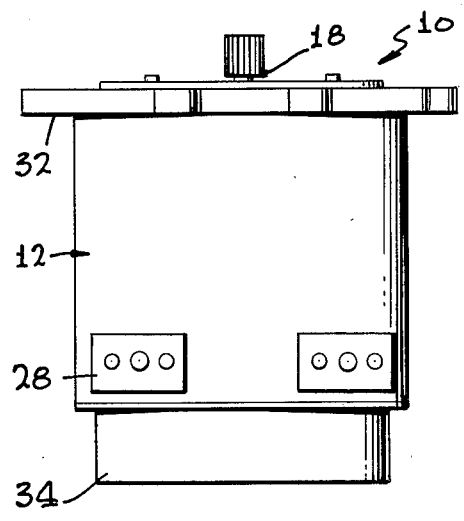
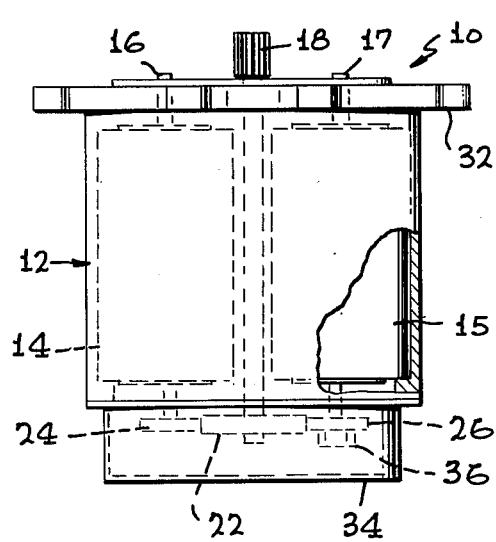
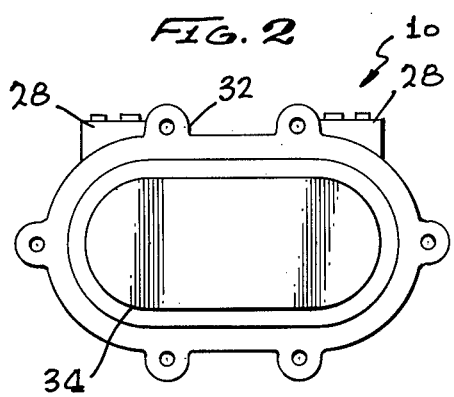
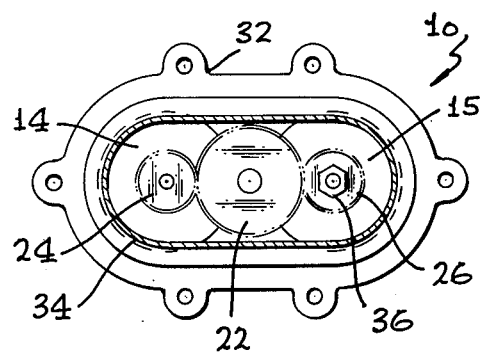
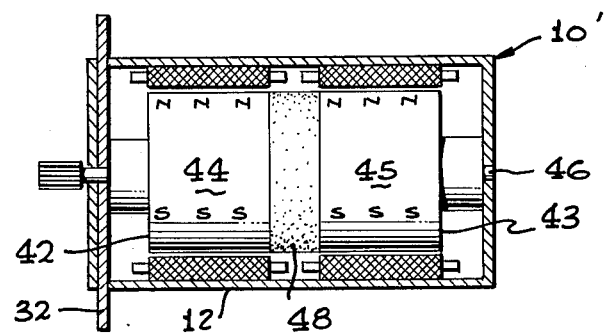

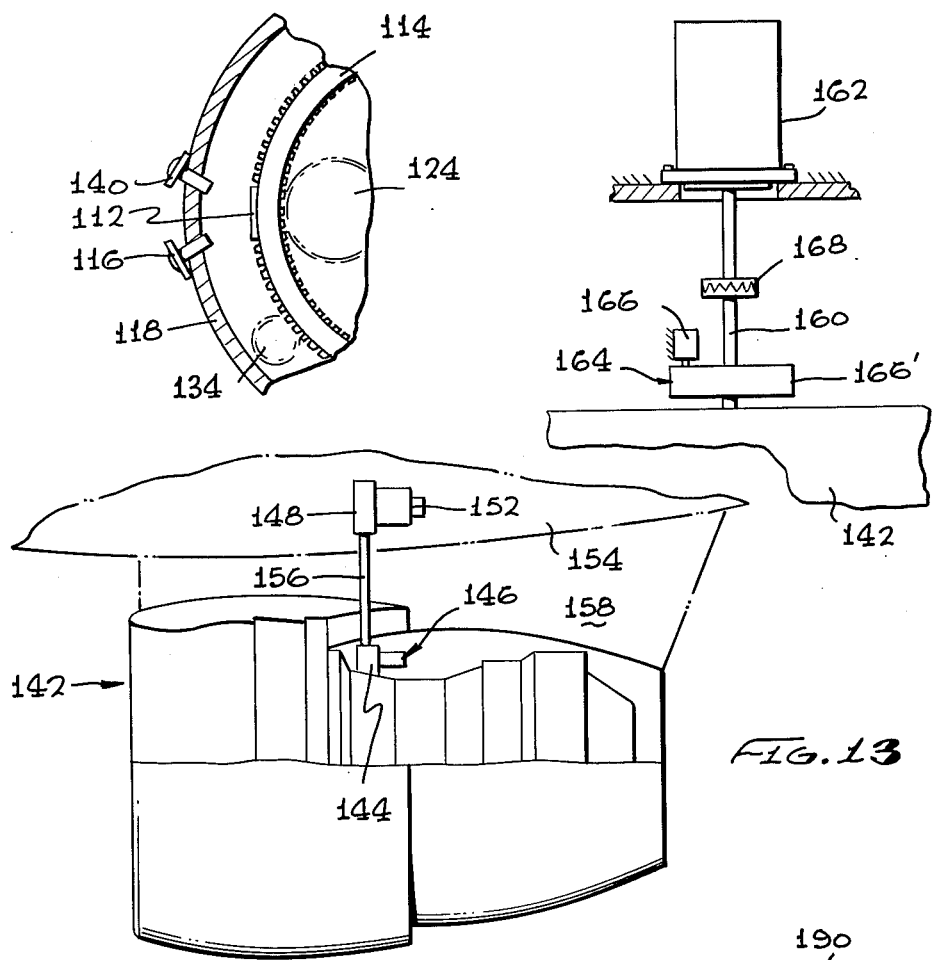
FIG. 12
FIG. 14
FIG. 13
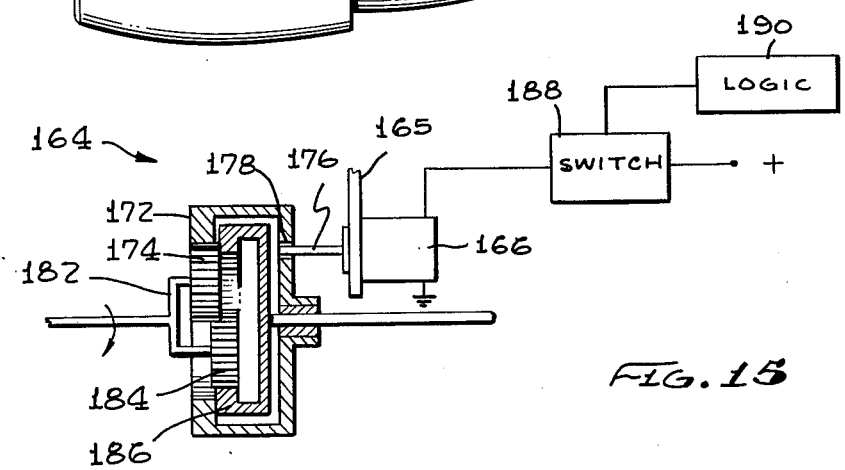
FIG. 15

TANDEM-GENERATOR DESIGN FOR AIRCRAFT

TECHNICAL FIELD

The invention relates generally to aircraft power generation systems, and in particular to a tandem generator design particularly useful in single and multi-engined aircraft. The power generation system includes an electromechanical disconnect device which isolates the generator in the event of a fault, and which is located in the power take-off (PTO) shaft on the engine(s).

BACKGROUND ART

In many aircraft systems a single drive source may only be available, but dual-redundancy in the generating system may be required for power integrity and reliability. Similarly, a four-generator power source may be necessary in a two-engine airplane.

In addition to the limitation of available drive sources in aircraft, there is also the problem that a single generator, unless oversized, may well be incapable of starting an engine. Where such a starting capability is desired, there is a need for a power generation system utilizing a machine arrangement which will overcome this problem. Finally, use of a plurality of conventional single generators would require additional mount-pads, drive-provisions, mechanical-interfaces, cooling-interfaces, and hydraulic-lines/heat exchangers.

Various tandem arrangements of electric machines are know. One such system, shown in U.S. Pat. No. 1,874,094 to Ford et al, discloses two AC machines with separate magnetic field systems in a single enclosure to form an electric transmission system. Several other U.S. patents, namely U.S. Pat. Nos. 907,176 to Richardson, 3,463,954 to Latta, 3,651,355 to Mason, and 3,717,780 to Hohne, Jr. et al, show multi-armature motors arranged in a single housing.

One progressive early approach to a dual machine-excitation method for alternators is disclosed in U.S. Pat. No. 653,088 to Hutin et al. In this patent, an in-line assembly of two machines on one shaft is shown, with the integrated machine incorporating multiple windings, including a "compensating" winding which neutralizes the effects of flux-distortion caused by armature reaction. The machine provides an excitation and voltage-regulation means which permits the AC generator to supply varying loads, and loads with different power factors.

The '088 invention was a precursor of more modern aircraft-type generators, where a DC exciter is mounted on the same shaft as the field of the alternator (AC generator). In these machines, the armature (AC winding) of the exciter is carried on the rotor and its AC output is rectified by diodes, also mounted on the rotor. The rectified AC output of the exciter is then applied to the field of the alternator. Regulation of the output AC voltage in these machines is effected by current-changes in the DC (stator) winding of the exciter.

The '088 and later machines, while using more than one electric machine in a single housing and mounting more than one rotor winding on a common shaft, nevertheless do not recognize, disclose or address the initial start, power generation, mounting, cooling and disconnect problems associated with aircraft and solved by the present invention. These problems have been recognized and solved herein by mounting and mechanically and electrically phase-aligning and electro-magnetically identical machines to permit separate or paralleled operation.

None of the aforementioned prior art approaches to power generation provide either a dual-redundancy of electric power in a single-powerplant, simultaneously providing integrated-cooling and a common mechanical interface with an aircraft engine drive, or a rapid and effective disconnect device for disconnecting such powerplants to prevent energy overloads.

In view of the inherent limitations and problems associated with aircraft applications and the above prior art approaches, there is a need to provide an aircraft power generation system that is utilizable and highly desirable where the number of available drive sources may be limited. Such a power generation system should ideally be capable of alleviating several problems associated with known aircraft-single generator arrangements; namely, that such single generators, unless oversized, are often incapable of starting an engine, require additional mount-pads, additional drive-provisions, additional mechanical-interfaces, additional cooling-interfaces, and additional hydraulic-lines/heat exchangers.

From the foregoing it can be seen that it is a primary object of this invention to provide a novel aircraft power generation system which includes a dual AC generator arrangement within a single housing. The generators are adapted to be driven by a single aircraft drive source to provide dual-redundancy in the aircraft power generation system for power integrity and reliability.

It is also an object of this invention to provide an aircraft "dual-generator" configuration in a single "tandem-generator" housing which utilizes one drive-power source, one mechanical-interface, and one cooling medium.

A still further object of the present invention is to provide a tandem-generator power system which improves source reliability of an aircraft electrical power system that has a high priority placed upon the loads.

Yet another object of the present invention is to provide a power generation system having a duality of power supply from a single engine driven source that can be mounted as a single entity on an aircraft engine pad, and that can have a single interface with a cooling fluid supply.

A still further object of the present invention is to provide a fast-acting mechanical shaft-disconnect control that can isolate an aircraft engine from a remote-driven accessory to protect it against mechanical-seizures and other problems.

DISCLOSURE OF INVENTION

The invention relates to a tandem generator arrangement for aircraft wherein two electrically separate three phase AC windings and two rotating fields are arranged in a single housing. The generators are arranged to be driven by a single aircraft drive source and require only a single mount pad and cooling medium. In a first embodiment, the two generators are arranged within the single housing in a "side-by-side" relationship, while in a second embodiment the generators are arranged "in-line" within the housing.

A second aspect of the invention includes an electromechanical disconnect located in proximity to the aircraft engine between the engine and the tandem generator arrangement. The disconnect, upon receiving a signal indicating an overload, overheat, etc., condition, activates via a solenoid to isolate the tandem generator.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only, and are not intended as a definition of the limits of the invention.

DESCRIPTION OF DRAWINGS

FIG. 1 is a plan view of a "side-by-side" tandem generator in accordance with the present invention;

FIG. 2 is an end view of the anti-drive end of the tandem generator of FIG. 1;

FIG. 3 is a plan view, partially broken away, of the tandem generator of FIG. 1;

FIG. 4 is an end plan view of the tandem generator of FIG. 1 with the gear drive cover removed;

FIG. 5 is a diagramatic cross-sectional view of an "in-line" tandem generator in accordance with another embodiment of the present invention;

FIG. 12 is a cross-sectional view taken on line 12—12 of FIG. 11;

FIG. 13 is a diagramatic view of an aircraft engine showing accessory machines driven by the engine via an electromechanical disconnect/transmission in accordance with another embodiment of the present invention;

FIG. 14 is a schematic view of an electromechanical disconnect/speed-changer in accordance with the present invention interposed between an aircraft engine and a generator; and FIG. 15 is a diagramatic view of the electromechanical/speed-changer of FIG. 14. In the various drawing Figures, like numerals denote like parts.

BEST MODE OF CARRYING OUT THE INVENTION

Figure 6:
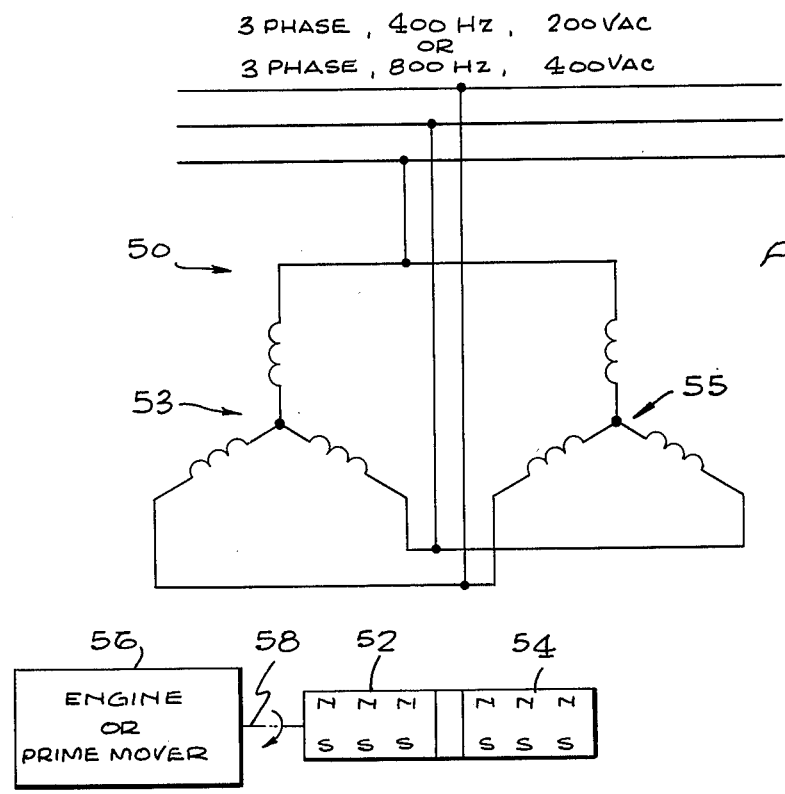
FIGS. 6–9 are electrical schematics showing various switching systems for handling the power outputs of the two generators of the FIG. 1 and 5 tandem generators.

In many aircraft, two (or even one) engines may be the only propulsion power-sources in the aircraft, but the dependence on electrics may be such that a multiple generator system is necessary. For example, in a two-engined aircraft, it would be possible to provide a four-channel generator system, by utilization of two tandem generators. From a reliability standpoint, this would be very desirable in an aircraft which might utilize electric power for the primary and secondary flight control systems, and other important services.

In accordance with one preferred embodiment of the present invention, two electrically and physically separate three-phase AC generators are cooperatively mounted in a single housing. When the electrical designs of both generators are identical, paralleling of the separate outputs is possible without attendant problems of speed and phase synchronization. Where the outputs are of different KVA capacity, one generator may be used as a "normal" power source and the other, lower capacity output, could be used as an "emergency" power source.

The tandem generator of the present invention can be designed for an "in-line" or "side-by-side" configuration. The "side-by-side" tandem generator configuration shown in FIGS. 1–4 demands special consideration with regard to mechanical and electrical phase-alignment. In an "in-line" tandem generator design, as shown in FIG. 5, it is possible to insure a precise mechanical phase alignment between the two generators in a simple manner. This mechanical phase-alignment is necessary since generators cannot be paralleled unless the electrical phase angle between the generators are closely controlled.

In accordance with a first embodiment of the present invention, as shown in FIGS. 1–4, a tandem generator (10) is provided having left and right generators (14) and (15) enclosed by a single housing (12). The cylindrical stators of generators (14) and (15) may be press fitted or otherwise secured within two cylindrical cavities in the housing (12). As can be seen by reference to FIGS. 1 and 3, both generators (14) and (15) can be cooled by a single fluid cooling loop, via a fluid inlet (16) and a return outlet (17). Any suitable coolant, such as oil or coolanol (ethylene glycol, etc.) or the like can be used.

As shown in FIGS. 3 and 4, an input drive shaft (18) is carried through the housing (12) and is arranged to drive generators (14) and (15) via interaction of a "drive" gear (22) with left generator "driven" gear (24) and right generator "driven" gear (26). Gears (22), (24) and (26) are all positioned at the "anti-drive" end of the machine (10). Positioning of these gears at the "anti-drive" end has three primary advantages: (1) gear-meshing can be accomplished while the tandem generator is mounted on the engine pad; (2) phase alignment of the generator rotors can be accomplished at the "anti-drive" end; and (3) a speed increase (or decrease) can be effected within the generator housing (12), removing dependence of the generator rotor speed on the engine drive shaft speed.

Referring again to FIGS. 1–4, the tandem generator (10) is shown to include dual three-phase output terminal blocks (28) and a mounting flange (32). The drive gear (22) and driven gears (24), (26) are enclosed at the anti-drive end of the tandem generator (10) by a gear cover (34). A mechanical phase indexer (36) including a phase adjust nut (38) associated with the, right generator (15) is utilized to carry out "vernier" phase-alignment of the generator rotors. As a means to enable alignment of the generator rotors, the driven gears (24), (26) are located on "master" splines on the rotor shafts of the two generators. When this "course-alignment" is effected, "vernier" phase-alignment can be accomplished by the indexer phase adjust nut (38), when the gears (24), (26) are meshed with the drive gear (22). This phase adjustment coupling is available industrially from the Harmonic Drive Division of USM Corporation under the name "infinite-indexer"; its operational principle is based upon "harmonic-drive" concepts. A turn of one flat of 60° on the indexer phase adjust nut (38) effects an arc-change of less than 0.6° (36 minutes). Such alignments can thus be made on the tandem generator of the drive source or, more appropriately, when it is mounted on the drive source. In the latter case, the adjustment can also be effected dynamically while the prime mover is running, using an oscilloscope to monitor the actual electrical phase-alignment conditions.

A second embodiment of the present invention in the form of an "in-line" tandem generator (10) is shown in FIG. 5, and consists of two generators (42), (43) having their respective rotors (44), (45) mounted upon a single drive shaft (46). The rotors (44), (45) are shown separated by a non-magnetic material (48) which inhibits flux-induced voltages in the winding overhangs. With this particular arrangement, the phase alignment requirements discussed hereinabove are simplified, but such a design results in an elongated generator, which in turn results in a large overhang xovement, when it is attached to the mounting-flange (32). The "side-by-side" tandem-generator arrangement (10), on the other hand, provides a lower overhung moment, but the synchrophasing requirements are somewhat more difficult and protracted.

The significant feature that only a single shaft drive is used for both tandem generators (10), (10') (in the housing), appears to abrogate the dual-redundancy capability of the machine. However, it is to be realized that the reliability of an electric power channel is dependent not only upon the generator, but upon many other system component elements; e.g., voltage regulators, supervisory control panels, differential current transformers, wiring, power-contactors, etc.; a failure of any one of these elements, or an electrical failure in the generator itself, would cause loss of that power channel. The probability of a shaft failure is therefore considered statistically remote, compared to the other multiple failure modes possible in the power-channel.

FIG. 6 schematically represents an "in-line" tandem generator configuration (50) which is designed and wired as, for example, a three-phase 800 Hz 400 VAC machine. The generator includes in-line rotors (52), (54) shown driven by an aircraft engine (56) via a drive shaft (58), and stator windings (53), (55) shown connected in parallel. The tandem generator (50) can also be used as a three-phase 400 Hz 200 VAC machine without any design change by running it at fifty percent of the 800 Hz synchronous speed: at this lower speed, the output of the machine will also be reduced 50%.

When the tandem generator (50) is used as a starter-generator, the 200 VAC 400 Hz power would correspond to the typical 50% ground idle speed of the engine (56). In the "start mode", when the permanent-magnet-generator (50) is used as a synchronous-motor-starter, the voltage and frequency would be programmed from a very low value, up to the 200V/400 Hz level, at a rate to control the acceleration-rate of the engine (56). This operation is as described in co-pending U.S. patent applications Ser. Nos. 183,079, filed Sept. 2, 1980 for "Direct Driven Generator System for ECS and Engine Starting", and 220,371, filed Dec. 29, 1980 for "Induction-Generator/Dual Samarium-Cobalt Generator Combination", both assigned to the assignee herein.

Figure 7A:
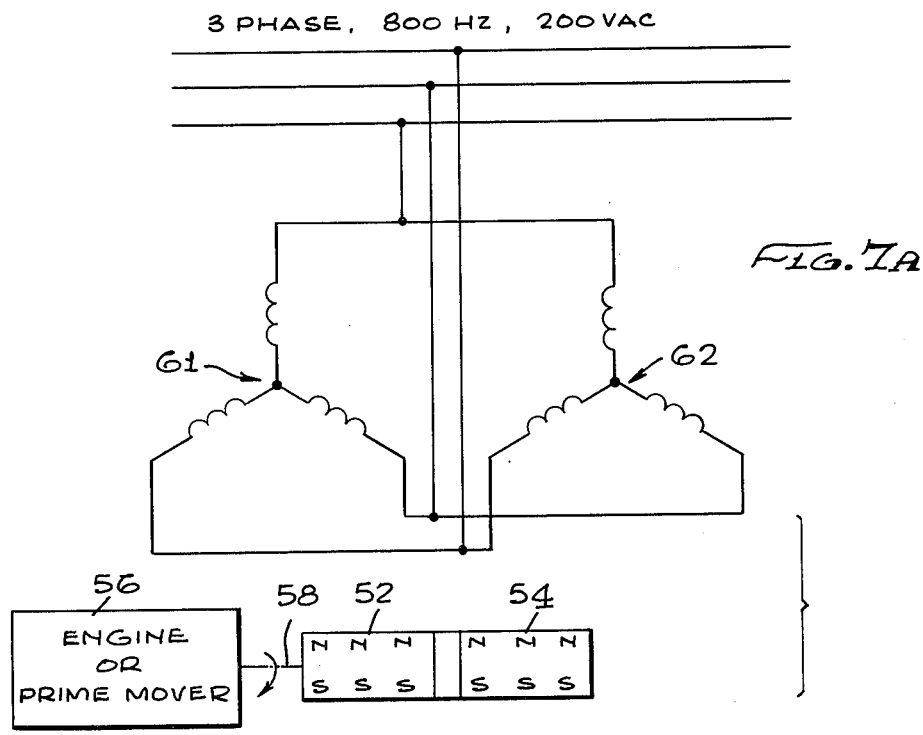
Figure 7B:
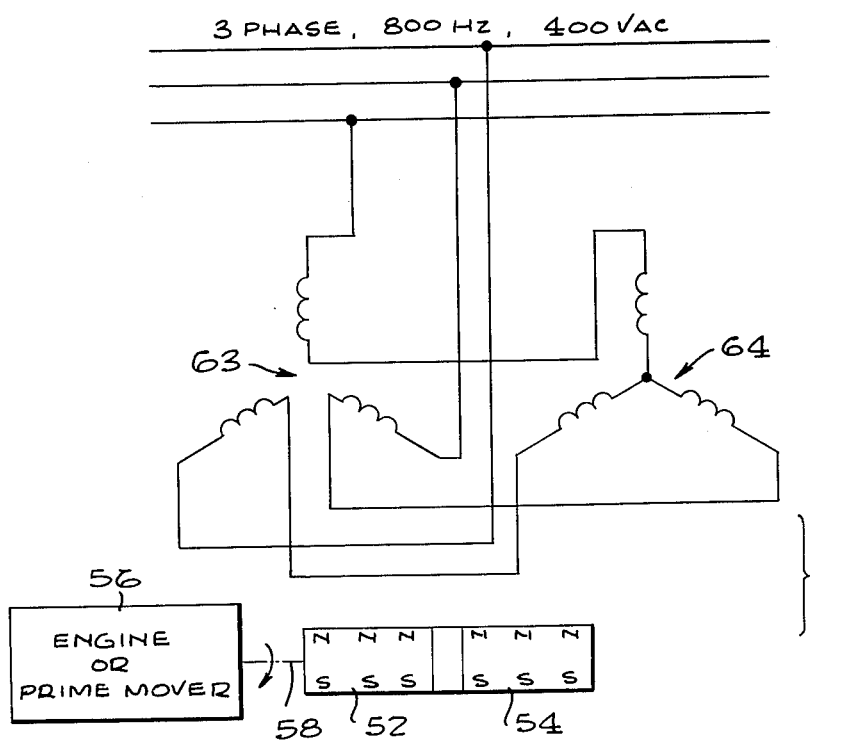

FIGS. 7A and 7B show an alternative utilization of the tandem-generator of the present invention wherein the stated phase windings (61), (62), (63), (64) are connected in parallel (FIG. 7A), or in series (FIG. 7B). In both cases the machine operates as an 800 Hz generator, but its voltage can be changed in a 2:1 ratio, to enable it to operate as a 200 VAC 800 Hz machine, or a 400 VAC 800 Hz machineAThe constraints on the use of this machine are as follows:

(i) If the stator windings are connected as in FIG. 7A, the 200 V/800 Hz would be unsuitable for AC (induction) motor loads, if the loads were designed for 400 V/800 Hz operation.
(ii) The FIG. 7B winding-configuration could not be used if the loads were designed for 200V/800 Hz operation.
(iii) Conventional 200 V/400 Hz power could not be applied, either to the generator as a starter, or to supply aircraft loads, if they were designed for 200 V/800 Hz operation.

The features and advantages of the FIGS. 7A and 7B winding changes are, however, as follows:

(a) The tandem-generator output voltage can be reduced 50%, to reduce the inrush currents to large induction-motors during starting.
(b) The generator output voltage could be reduced 50% to reduce loads, in an emergency, when there might be a lack of cooling capability. Induction-motors, however, would have to be isolated (turned off) in this mode; otherwise, they would be subject to excessive rotor heating.

Figure 8:
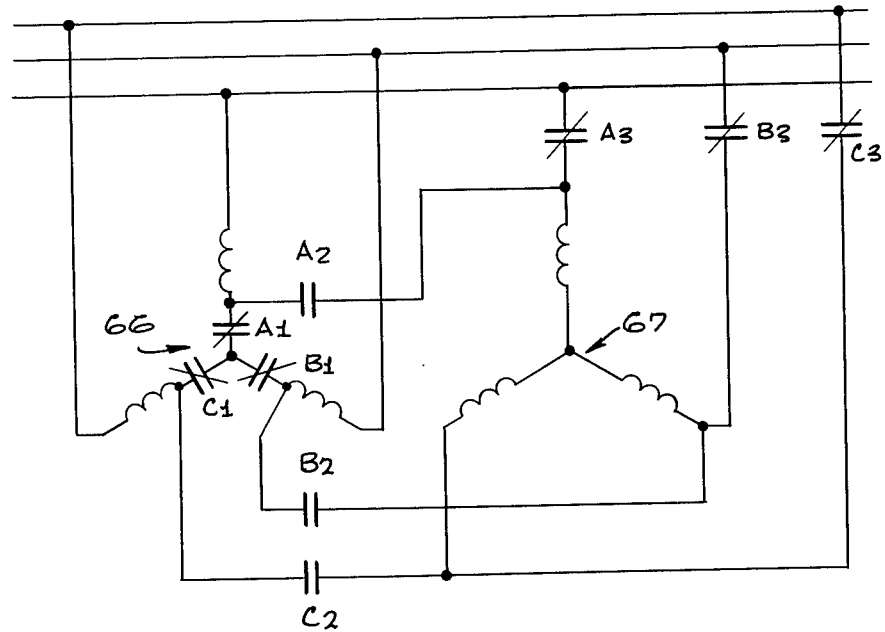

FIG. 8 shows the alternative wiring arrangement wherein three-phase contactors (A1, B1, C1), (A2, B2, C2), and (A3, B3, C3) provide the ability to connect the windings (66), (67) either parallel, as in FIG. 6, or in series, as in FIG. 7. When the three-phase contactors (A2, B2, C2) are open, and the contactors (A1, B1, C1) and (A3, B3, C3) are closed, the windings (66), (67) are in parallel; when the contactors (A1, B1, C1) and (A3, B3, C3) are open and the contactor (A2, B2, C2) is closed, the windings (66), (67) are in series.

A primary feature of the FIG. 8 arrangement is that the tandem-generator can be used as a full capacity machine in either configuration, i.e., if each winding is rated for 100 KVA, the machine can provide an output 200 KVA in both configurations. In one configuration at 200 volts 577 amps and, in the other case, 400 volts at 289 amps.

Figure 9:
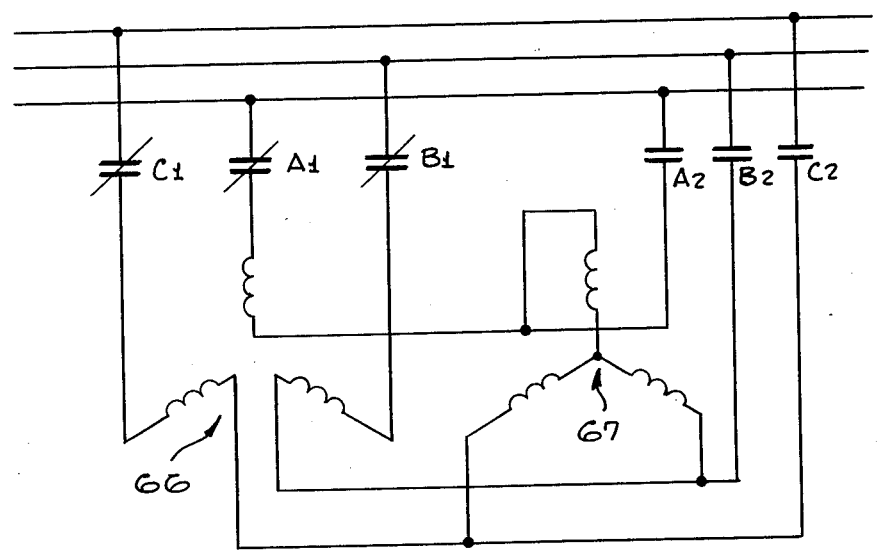

In the FIG. 9 arrangement of the tandem-generator of the present invention, each phase is center tapped. Thus, depending on the various positions of three-phase contactors (A1, B1, C1), (A2, B2, C2), the whole winding or half a winding may be used for each phase. It might be desirable, for example in starting a motor, temporarily to reduce voltage. Normally, contactor (A1, B1, C1) is closed and contactor (A2, B2, C2) is open, allowing the machine to operate at 400 V. When, however, contactor (A1, B1, C1) is open and contactor (A2, B2, C2) is closed, only the right hand section of the machine is used and so the output voltage and KVA are reduced 50%. Of course it might be desired to use combinations of the various systems described in FIGS. 6-9.

Figure 10:
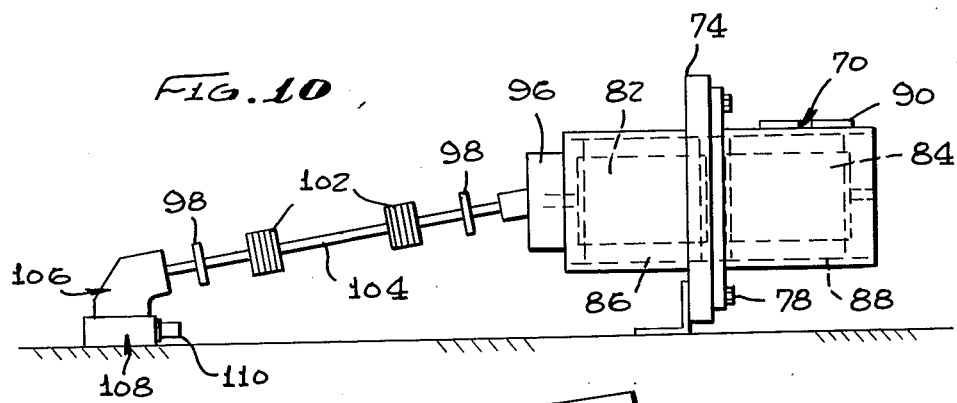
FIG. 10 is a diagramatic view of an aircraft engine, "in-line" tandem generator, and an electro-mechanical disconnect power generation system in accordance with another aspect of the present invention.

FIG. 10 shows an embodiment of an "in-line" tandem-generator (70) in accordance with the present invention wherein a central mount (72) is utilized to overcome overhung moment problems associated with "in-line" configurations. In this case, the tandem-generator (70) is secured via a centrally located flange (72) to a structural mount pad (74) relative to an aircraft engine (76) by a plurality of bolts (78) (two shown). The tandem-generator (70) is shown with its two permanent magnet sections (82), (84), dual AC armatures (stators) (86), (88), and AC terminal blocks (92).

One end of the tandem-generator housing (94) is provided with a bevel gearbox arrangement (96). The bevel gear drive is connected via two fixed plate couplings (98) and two in line flex couplings (102) positioned along power transmission shaft (104) to an angle gearbox (106) driven by the engine (76). This allows the power transmission shaft (104) and the flex couplings (102) to be slid between (or removed from) the fixed plate couplings (98).

The permanent magnet machines, such as the permanent magnet tandem AC generator (70), cannot be de-energized unless the drive source is itself isolated. Therefore in the event of a fault in the armature windings of the machine, the present invention provides an automatic disconnect method to prevent the possibility of destructive fault currents.

Referring to FIG. 10, an electromechanical disconnect (108) including an electric solenoid (110) is shown interposed as an integral part of the transmission mechanism for driving the tandem AC generator (70). Since it is relatively simple to detect overcurrents, the electromechanical disconnect (108) arrangement of FIG. 10 will ensure rapid isolation of the generator (70) right at the engine take-off in the event of such faults. The disconnect (108) can also be designed to operate in the event of any failure in the power transmission system itself.

Figure 11:
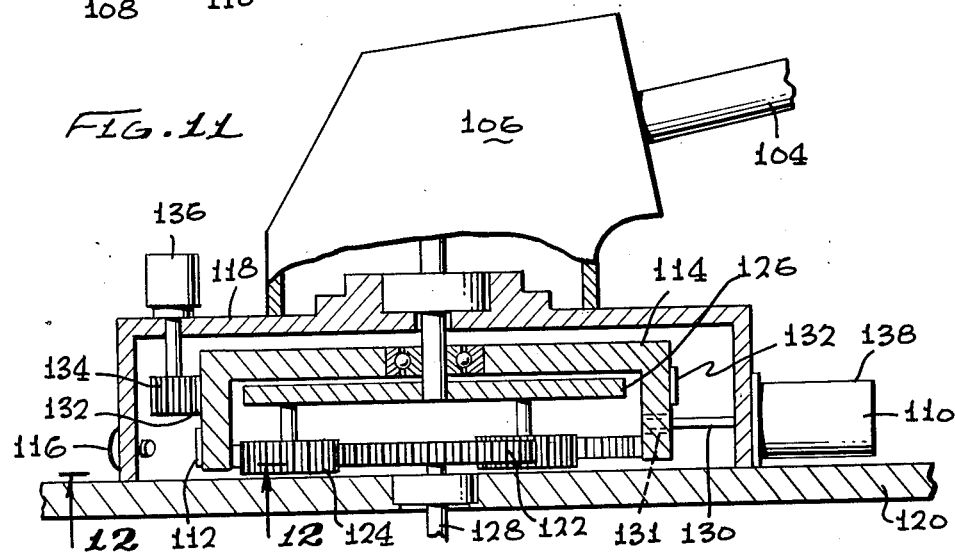
FIG. 11 is an enlarged cross-sectional view partly broken away of the electromechanical disconnect of FIG. 10.

The electromechanical disconnect (108) of FIG. 10 is shown in greater detail in FIGS. 11 and 12. FIG. 11 shows the electromechanical disconnect (108) to include an optical position sensor comprising a reflector (112) on a ring-gear (114) and a light emitting diode (116) in the gearbox housing (118). The housing (118) is shown attached to the top (120) of the engine case and encloses a planetary differential including a sun gear (122), planet gears (124), the ring gear (114), and a planet-carrier (126). An interfacing takes place therefore from the engine to the gearbox (106) via the power input shaft (128) and the electromechanical disconnect (108).

The ring gear (114) of the differential is normally held against rotation by a pin (130) inserted in a hole bored in the ring housing which includes outside teeth (132) which mesh with a gear (134) connected through the housing (118) to a socket (136). When power input shaft (128) rotates and the ring gear (114) is locked, velocity and torque is transmitted via the sun gear (4), through the planet gear (124) and planet carrier (126) to the output transmission shaft (104).

When an abnormal electric current is detected in the tandem generator, the electric solenoid (110) is energized to withdraw the pin (130) from the hole (131) in the ring gear housing. At this point, the ring gear (114) spins freely and is unable to react any torque: transmission of power to the output shaft (104) is not therefore possible. The tandem-generator is thus isolated from its drive source, thereby preventing any electrical, thermal or mechanical damage.

Indication that the solenoid is in its "disconnect" position can be noted by the protrusion of the pin (130) through the end of the solenoid enclosure (138). Since the electric solenoid (110) is now electrically "latched out", "reset" can only be accomplished by a deliberate mechhanical action on the ground.

When the fault has been eliminated, reset is accomplished as follows:

(1) A socket wrench (not shown) may be attached to the socket (136) and turned, (or the socket may be turned by hand), until visual light indication is observed via the light detection system shown in FIG. 12. Light from the LED (116) strikes the reflector (112) and is reflected for detection by a photo transistor (140). A change of state of the photo transistor (140) actuates a light (not shown) to indicate line-up of the pin (130) with the hole (131). At this point, the pin (130)—under pressure of a spring—is forced into the hole (131) when the electrical latch on the solenoid is interrupted; and (2) A check is made to see that the solenoid pin (130) has re-engaged with the hole (131). This engagement will also be indicated by a high increase in the torque at the socket (136).

FIGS. 13–15 show another embodiment of a fast-acting mechanical shaft-disconnect control in accordance with the present invention that can isolate an engine (142) from a remote-driven accessory, thereby protecting it against mechanical-seizures and other problems such as loss of cooling, etc., that might occur at remote locations. FIG. 13 shows a typical aircraft arrangement where a vertical power-take-off drives a generator and/or a gearbox located in a pylon, wing or fuselage location. In the FIG. 13 schematic, the engine (142) drives, through an electromechanical disconnect (144) to a remote gearbox (148), which in turn drives the generator (152) or other accessories. Control of the disconnect (144) is effected via the solenoid (186). As the remote gearbox (148) is driven by the drive shaft (156) (which passes through the pylon (158)), the engine (142) can be protected against shaft bearing failures, gearbox/generator failures, etc., by operation of the electromechanical disconnect (144) which is located in position as shown in FIG. 13.

Referring now to FIGS. 14 and 15, the electromechanical disconnect and speed changer assembly (164) described therein fulfills the dual role of a disconnect and a speed-change element in the drive shaft system. Usually, the power take-off shaft (160) will not be at the right speed for the remote gearbox or generator (162). Therefore, by use of one or more planetary gear sets, a speed-change can be accomplished in the electromechanical speed-change and disconnect assembly (164), which is located close to the take-off point of the power shaft on the engine (142). An electric-solenoid (166) is shown located above the assembly (164), but is fixed to the pylon or other structure (165) independently of the engine (142). A diaphragm-shaft (168) is shown to take care of vibrational, and/or differential misalignments, but this is not pertinent to the novel features of the speed-changer and disconnect assembly (164) of the present invention.

FIG. 15 is an enlarged schematic representation of the electromechanical disconnect and speed changer assembly (164); again, the gear set arrangement and planetary configuration are typical only. The feature of the planetary gear system, however, is that the ring gear (172), interfacing with the left carrier gear (174), is constrained against rotational motion by the pin (176) of the solenoid (166), protruding through a hole (178) in the housing of ring-gear (172). Thus, with the ring gear (172) so constrained, it is able to react the torgue of the input-carrier (182), and thus transmit the torque to the right-gear (184) which, in turn, transmits it to the output ring-gear (186). The input-drive-to-output-drive torque/speed transmission is therefore simply accomplished. Disconnect is accomplished by activation of the solenoid (166) via a switch (188) which is controlled by the logic system (190). Various gear-ratios in the disconnect and speed changer assembly (164) could, of course, be provided by utilizing suitable "stepped-gears".

Under normal conditions, torque/speed transmission operation is accomplished with the ring-gear (172) constrained. If, however, the "logic" (190) detects an over-temperature condition, an excessive-torque, or excessive current, or, a "differential-current" fault in the generator (162), a "turn-on" command is given by the logic (190) to gate an SCR via a normally closed switch, both located in switch assembly (188). At this time the SCR turns on and energizes solenoid (166), causing the solenoid-pin to be withdrawn from the hole (178) in the ring gear-housing. The left carrier gear (174) is now able to spin free and it is therefore no longer able to react the torque of the gear train. Electrically, the switch assembly (188) will insure that the solenoid (166) is "latched-up" until it can be de-energized at a later time by opening the normally closed switch. Therefore, once the disconnect has operated in flight, it cannot be reset again until the aircraft is on the ground and the engines have been shut-down.

From the foregoing it can be seen that a tandem-generator and power generation system has been provided in accordance with the present invention which utilizes a single cooling loop, a single mount capability, an adjustable gear-ratio capability, single mechanical shaft input, and a phase alignment capability. As stated, the in-line generator is more capable of easy production phase-alignment, but there may be instances where the overall length, or the L/D ratio, may be too large. Nevertheless, it is still in many instances a practical and viable configuration. In either configuration discussed hereinabove, an efficient and fast acting disconnect and/or disconnect/transmission means is provided to give the required drive characteristics, while simultaneously providing protection against overload, overheat, bearing breakdown, and the like conditions in the power generation system.

It is apparent that there has been provided with this invention a novel Tandem-Generator Design for Aircraft which fully satisfies the objects, means, and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

The disclosures of the aforementioned United States patents and patent applications are incorporated by reference herein.

INDUSTRIAL APPLICATION

The tandem generator and electromechanical disconnect of the present invention is useful for installation in aircraft by mounting to one or more aircraft engine drives to provide reliable and needed electrical power to various aircraft subsystems.

I claim:

1. An aircraft power generation system comprising in combination:
    an aircraft engine, said engine having at least one drive shaft;
    a tandem generator driven by said at least one drive shaft, said tandem generator comprising two permanent magnet AC synchronous generators arranged in a single housing;
    a mechanical drive mechanism interactively interposed between said at least one drive shaft and said tandem generator; and
    disconnect means associated with said mechanical drive mechanism for selectively isolating said engine from said tandem generator when said engine is running, said disconnect means comprising:
    means for speed adjustment between said engine and said tandem generator, said speed adjustment means comprising a planetary differential having interactive sun gear, planet gear, planet carrier and ring gear elements within a planetary differential housing for carrying out said speed adjustment;
    disconnect means including an electric solenoid mounted to said housing and adapted to actuate pin means for selectively locking or releasing said ring gear element by moving said pin into "lock" and "release" positions;
    electromechanical switch means for actuating said electric solenoid and further including logic means for activating said switch means responsive to abnormal torque of said mechanical drive system, mechanical overheating of said power generation system and electrothermal overheating of said power generation system; and
    means for monitoring the position of said ring gear.

2. An aircraft power generation system as in claim 1 wherein said monitoring means comprises an electro-optical system comprising light emitting means mounted to said housing, reflector means mounted on said ring gear, and photo transistor means mounted on said housing, said light emitting, reflector and photo transistor means being arranged relative to each other such that reflected light from said reflector activates said electric solenoid when said gear housing is in a predetermined position relative to said ring gear whereby said pin engages a hole in said ring gear.

* * * * *